United States Patent

Eilersen

[15] 3,646,433
[45] Feb. 29, 1972

[54] CIRCUIT FOR COMPARING THE CAPACITANCE OF CAPACITANCE ELEMENTS

[72] Inventor: Nils Aage Juul Eilersen, Gongehusvej, 226-232, DK-2950, Vedboek, Denmark

[22] Filed: Apr. 20, 1970

[21] Appl. No.: 30,164

[30] Foreign Application Priority Data

Apr. 21, 1969 Denmark..............................2157/69

[52] U.S. Cl............................................................324/60
[51] Int. Cl.....................................G01r 11/52, G01r 27/26
[58] Field of Search...................324/60, 61, 60 B, 61 B, 62 B

[56] References Cited

UNITED STATES PATENTS

| | | | |
|---|---|---|---|
| 2,820,194 | 1/1958 | Reinartz | 324/57 |
| 3,086,169 | 4/1963 | Eyon | 324/30 |
| 3,452,274 | 6/1969 | Povey | 324/61 |

Primary Examiner—Alfred E. Smith
Attorney—Watson, Cole, Grindle & Watson

[57] ABSTRACT

In a circuit for capacitance measurement, particularly for comparison of capacity values, a principal capacitor and a reference capacitor, each in series with an auxiliary capacitor, are connected between the terminals of an AC source. The principal capacitor and the reference capacitor are each shunted by two voltage limiting rectifier couplings, and a pair of such couplings, belonging to the principal capacitor and the reference capacitor respectively and having opposite directions of conduction, are completed through a common load. Preferably, said rectifier couplings may comprise diode rectifiers, and some or all of them may additionally comprise Zener diodes.

5 Claims, 4 Drawing Figures

3,646,433

CIRCUIT FOR COMPARING THE CAPACITANCE OF CAPACITANCE ELEMENTS

BACKGROUND OF THE INVENTION

This invention relates to a capacitance measurement circuit, and more particularly to a circuit for the comparison and measurement of small capacitances and small changes in capacitance. The capacitance elements concerned will be referred to in the following as capacitors, whether they are in the form of ordinary capacitors for general circuitry purposes, or in the form of special structures for measuring physical values such as pressures within a pipe, contractions and expansions of structural parts etc. Where the capacity values of two capacitors are to be compared, one of these will be referred to as the principal capacitor and the other as the reference capacitor, though in many cases these two terms are freely interchangeable.

For comparing the capacity values of a principal capacitor and a reference capacitor circuits are known, in which both capacitors are connected to the terminals of an oscillator or other source of an input AC voltage through input circuits including rectifier couplings having opposite directions of conduction, and are also connected to said terminals through output circuits including a load common to the output circuits of both capacitors. In this manner a DC output voltage component representative of the difference of the capacity values of the two condensers will be produced across the said load and may be measured by means of a DC measuring instrument, which may in fact itself form the common load or part of this load, to determine the said difference.

It has been found, however, that the said DC voltage component will also depend not only on the peak to peak value of the input voltage, but also on the degree of symmetry of the input voltage in respect of both positive and negative peak values and the relative duration of positive and negative half cycles. If symmetry in respect of peak values is established by means of a voltage divider, it becomes impossible except by using a transformer to ground both one terminal of the oscillator and one terminal of each capacitor, such as is highly desirable for practical purposes, and there may still be lack of symmetry in respect of the relative duration of positive and negative half cycles.

The influence of the input voltage on the measuring result may of course be eliminated by means of an input voltage control device, but if this is also to eliminate errors resulting from lack of symmetry, it will have to be rather elaborate and expensive.

SUMMARY OF THE INVENTION

According to the invention, a principal capacitor and a reference capacitor, each in series with an auxiliary capacitor, are connected between terminals for the supply of an AC voltage, each of said principal and reference capacitors being shunted by two voltage limiting rectifier couplings having opposite directions of conduction, at least one pair of voltage limiting rectifier couplings associated with said principal capacitor and said reference capacitor respectively and having opposite directions of conduction being completed through a common load.

As will be shown in the following it becomes possible, by using the circuit according to the invention, substantially to eliminate the influence of both the peak to peak value and any lack of symmetry of the input voltage.

In preferred embodiments of the invention, some of said rectifier couplings include Zener diodes, which may or may not be common to circuits of the principal capacitor and the reference capacitor.

Where high accuracy is not essential, and the main purpose is to assess variations of the capacity value of the principal capacitor, the circuit may be simplified by omitting the reference capacitor and all the rectifier couplings associated therewith.

DESCRIPTION OF THE PREFERRED EMBODIMENTS

Figure 1:
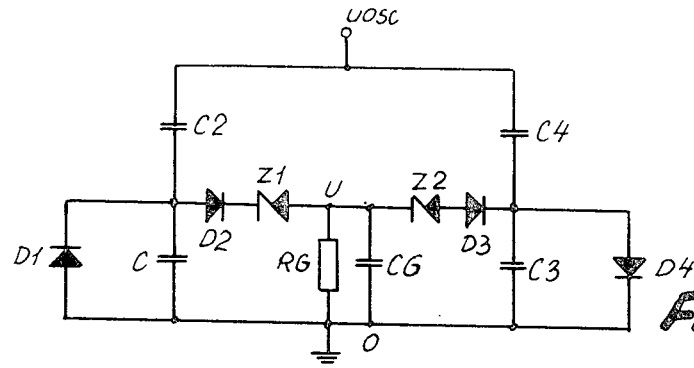
FIG. 1 shows a circuit according to a first embodiment of the invention.

In the first embodiment of the invention illustrated in FIG. 1, C is a principal capacitor, which is shunted by a first voltage limiting rectifier coupling consisting of a diode D1 and a second voltage limiting rectifier coupling comprising a diode D2, a Zener diode Z1 and a load RG–CG. C3 is a reference capacitor which is shunted by a first voltage limiting rectifier coupling consisting of a diode D4 and a second voltage limiting rectifier coupling comprising a diode D3, a Zener diode Z2 and the load RG–CG in common with the second rectifier coupling of the principal capacitor C. The principal capacitor is connected in series with an auxiliary capacitor C2 between the terminals O and UOSC of an oscillator or other suitable source of AC voltage. The reference capacitor C3 is connected in series with an auxiliary capacitor C4 between the terminals O and UOSC.

The Zener voltage of the Zener diodes Z1 and Z2 will be designated as UZ1 and UZ2.

The AC voltage UOSC having a positive peak value U1, a negative peak value U2 and a frequency $f$ is applied to the circuit and it is assumed that CG>>C, C3, C2 and C4 and that the output voltage across the load RG–CG, U<<UZ1 and UZ2, and that the threshold voltage of the diodes D1, D2, D3, D4 in the direction of conduction is negligible as compared with UZ1 and UZ2.

When UOSC assumes the value U1, C will be charged to the voltage UZ1 through C2, and the remainder of the charge transferred from C2 will pass via D2 and Z1 to and through RG–CG when C has reached the Zener voltage UZ1. C2 will assume the voltage U1–UZ1.

Similarly C3 will be charged to the voltage O via C4, because it is shortcircuited by D4. C4 will assume the voltage U1.

When UOSC assumes the value –U2, C will be charged to O via C2, wince it is shortcircuited by D1. C2 will assume the voltage –U2.

C3 will be charged to –UZ2 via C4, and the remainder of the charge transferred from C4 will pass via D3 and Z2 into and through RG–CG when C3 reaches the Zener voltage –UZ2. C4 will assume the voltage –U2+UZ2.

When UOSC changes from –U2 to U1, C2 transfers the charge C2(U1–UZ1+U2) to C and RG–CG.

Since C absorbs the charge C UZ1, RG–CG will receive the charge C2(U1–UZ1+U2)–C UZ1, which corresponds to the current $f[C2(U1-UZ1+U2)-C\ UZ1]$.

When UOSC changes from U1 to –U2, C4 transfers the charge C4(–U2+UZ2–U1) to C3 and RG–CG.

Since C3 absorbs the charge –C3 UZ2, RG–CG will receive the charge C4(–U2+UZ2–U1)+C3 UZ2, which corresponds to the current $f[C4(-U2+UZ2-U1)+C3\ UZ2]$.

If the time constant RG·CG is selected >>T=1/$f$, a DC voltage component U will be produced across the load RG–CG equal to $$\text{I}\quad U = RG \cdot f[C2(U1-UZ1+U2)-C\ UZ1]+RG \cdot f[C4(-U2+UZ2-U1)+C3\ UZ2].$$

If C2=C4 and UZ1=UZ2=UZ, the above equation is reduced to the following form $$\text{II}\quad U = RG\ f\ UZ(C3-C).$$

Thus, it will be seen that the value of U, which may be measured by means of an ordinary measuring instrument, is independent not only of the peak to peak value of the input voltage, but also of the degree of symmetry of the input voltage, because all the terms of equation I containing the positive and negative peak values U1 and −U2 compensate each other and the relative durations of the positive and negative half cycles do not occur in the equation.

Moreover, it will be seen from the expression of U that the circuit provides a high output DC voltage and a small output impedance, if only $f$ and UZ are selected suitably high.

An amplification of U is unnecessary in most cases.

It is a great advantage that C, C3, U and the AC source have a common ground connection.

If UZ is selected high, it may, however, be difficult to obtain sufficient uniformity of the temperature coefficients of UZ1 and UZ2 over a large temperature range, and in the case of UZ1 ≠ UZ2 the O-point of U is strongly displaced.

Figure 2:
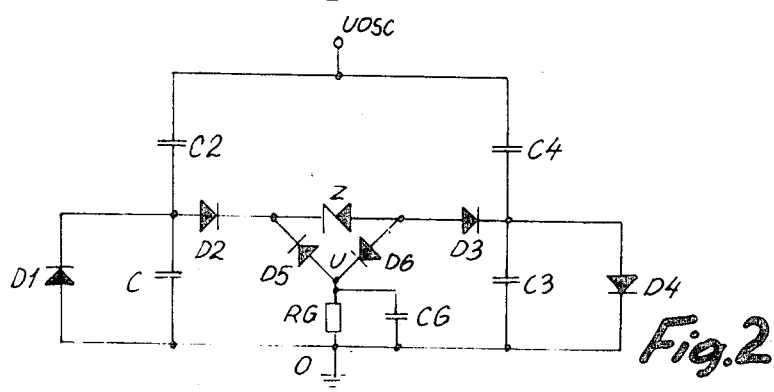
FIG. 2 shows a circuit according to a second embodiment of the invention.

This may be avoided by constructing the circuit with a single Zener diode Z, but two extra diodes D5 and D6, as illustrated in the embodiment of FIG. 2.

In the case of this circuit, the same equations apply as for the circuit of FIG. 1. However, the special feature of the circuit of FIG. 2 is that D5, D6 and Z are so connected that the charge transferred from C2 to RG-CG will pass through D2, Z, D6, while the charge transferred from C4 to RG-CG will pass through D3, Z, D5. Thus, the charges transferred to RG-CG will pass through the same Zener diode, whereby the problem of different temperature coefficients of UZ1 and UZ2 in the circuit of FIG. 1 is eliminated.

The possibility of making a circuit as illustrated in FIG. 2 operative depends on the fact that a threshold voltage of 0.3-0.6 volt is to be exceeded before a diode conducts in its direction of conducting, failing which the charge to be transferred from C2 to RG-CG would not pass via D2, Z, D6 to RG-CG, but would instead pass via D2, Z, D3, D4, thus circumventing RG-CG, as soon as the voltage U would become a little positive.

Similarly, the charge to be transferred from C4 to RG-CG would not pass via D3, Z, D5 to RG-CG, but would instead pass via D3, Z, D2, D1, thus circumventing RG-CG, as soon as the voltage U across RG-CG would become a little negative.

On account of the threshold voltage of the diodes, the charges will pass through RG-CG as long as the sum of U+ the threshold value of D6 (in the case of U>O) is smaller than the threshold voltage of D3+D4. Similarly in the case of U<O.

In practice, the result will be that U is limited to U<±0.25 volt, but since the output impedance may be very low, this simple measuring circuit may directly operate recording instruments so that expensive amplifiers are often unnecessary.

The measuring circuit of FIG. 2, like that of FIG. 1, is independent of the amplitude and symmetry of UOSC, and C, C3, U and the AC voltage source have a common ground connection.

Figure 3:
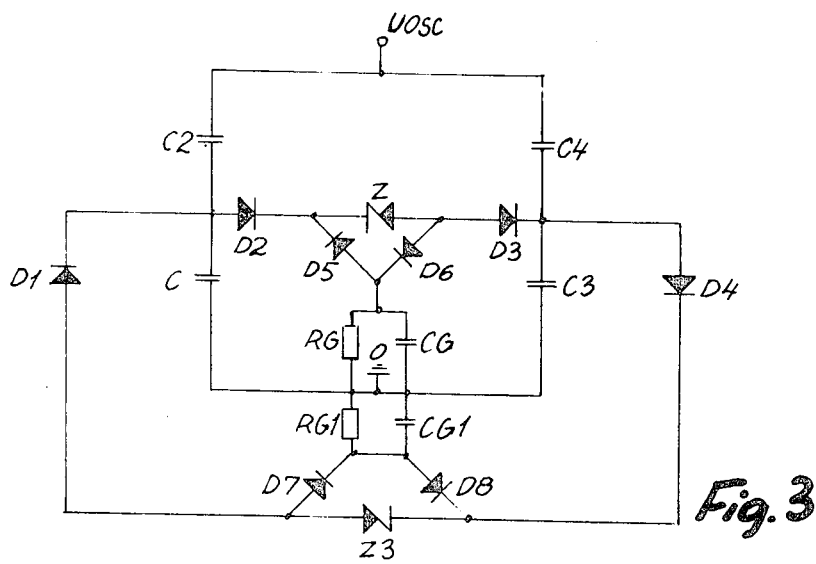
FIG. 3 shows a circuit according to a third embodiment of the invention.

In the embodiment of FIG. 3, C and C3 have one pair of common load circuits arranged in the same manner as in FIG. 2, but the simple diode connections D1 and D4 across C and C3 have been replaced by voltage limiting rectifier couplings in the form of another pair of common load circuits symmetrical to the first pair of common load circuits and comprising a Zener diode Z3 having a Zener voltage UZ3, diodes D7 and D8 and a load RG1-CG1. In this manner it becomes possible to obtain high values of the output voltage U of the circuit. It is assumed that CG and CG1>>C, C3, C2, C4 and that the output voltage U<<UZ and UZ3.

When UOSC assumes the value U1, C will be charged to the voltage UZ through C2, and the remainder of the charge transferred from C2 will pass via D2, Z, D6 to and through RG-CG when C has reached the Zener voltage UZ. C2 will assume the voltage U1−UZ.

Similarly, C3 will be charged to the voltage UZ3 via C4, and the remainder of the charge transferred from C4 will pass via D4, Z3, D7 to and through RG1-CG1 when C3 has reached the Zener voltage UZ3. C4 will assume the voltage U1−UZ3.

When UOSC assumes the value −U2, C will be charged to −UZ3 via C2, and the remainder of the charge transferred from C2 will pass via D1, Z3, D8 to and through RG1-CG1 when C has reached the Zener voltage −UZ3. C2 will assume the voltage −U2+UZ3.

C3 will be charged to −UZ via C4, and the remainder of the charge transferred from C4 will pass via D3, Z, D5 to and through RG-CG when C3 reaches the Zener voltage −UZ. C4 will assume the voltage −U2+UZ.

When UOSC changes from −U2 to U1, C2 transfers the charge C2 (U1−UZ+U2−UZ3) to C and RG-CG.

Since C absorbs the charge C (UZ+UZ3), RG-CG will receive the charge C2 (U1−UZ+U2−UZ3)−C (UZ+UZ3), which corresponds to the current $f$[C2(U1−UZ+U2−UZ3)−C(UZ+UZ3)].

When UOSC changes from U1 to −U2, C4 transfers the charge C4(−U2+UZ−U1+UZ3) to C3 and RG-CG.

Since C3 absorbs the charge C3(−UZ−UZ3), RG-CG will receive the charge C4(−U2+UZ−U1+UZ3)+C3(UZ+UZ3), which corresponds to the current $f$[C4(−U2+UZ−U1+UZ3)+C3(UZ+UZ3)].

If the time constant RG·CG is selected >>T=1/$f$, a DC voltage component U will be produced across the load RG-CG equal to III U=RG·$f$[C2(U1−UZ+U2−UZ3)−C(UZ+UZ3)]+RG·$f$[C4(−U2+UZ−U1+UZ3)+C3(UZ+UZ3)].

If C2=C4, the above equation is reduced to the following form

IV U=RG·$f$(UZ+UZ3)(C3−C).

Similarly, the voltage UA across RG1-CG1 will be UA=RG1·$f$(UZ+UZ3)(C−C3).

It will be seen that if RG=RG1, the circuit will produce a positive and a negative output voltage of equal numerical value, which is frequently advantageous. If only the output value U is needed, RG1-CG1 can be selected equal to zero. It will be seen that the output voltage is independent not only of the peak to peak value of the input voltage, but also of the degree of symmetry of the input voltage. With the circuit of FIG. 3 the drawback that the zero point of U may be displaced on account of the temperature coefficients of the Zener diodes, such as may occur with the circuit of FIG. 1, has been eliminated in the same manner as in FIG. 2 and besides, the influence of the said temperature coefficients on the values of U and UA may be eliminated by selecting the temperature coefficients of UZ and UZ3 equal, but with opposite signs.

It will also be seen that with the circuit of FIG. 3, the output voltage may be made as high and the output impedance as low as desired by suitably selecting $f$, UZ and UZ3. Moreover, C, C3 and U and the AC source have a common ground connection.

Figure 4:
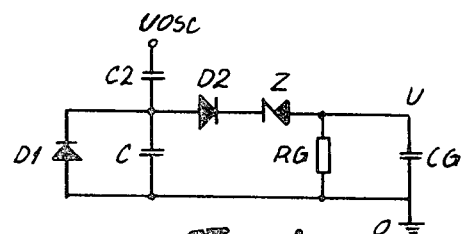
FIG. 4 shows a circuit according to a fourth embodiment of the invention.

The circuit illustrated in FIG. 4 corresponds to that of FIG. 1 with the modification that the reference capacitor C3 and all components associated therewith, i.e., C4, D3, D4 and Z2, have been removed. The simplified circuit of FIG. 4 may be used in cases where accuracy of measurement is not essential and where particularly the variations of the principal capacitor are to be determined. The output voltage across RG-CG will be V U=RG·$f$[C2(U1−UZ+U2)−C·UZ].

It will be seen that if during a testing or watching period U1, U2 and UZ remain constant, the variations of U will be proportional to the variations of C.

If desired, the output voltage, instead of being directly measured, may be compared with a reference voltage, which may be so adjusted as to establish a neutral state, from which variations of C are to be registered.

While in all the embodiments illustrated the load across which the output voltage to be used for measuring purposes is developed has been shown in the form of a resistor RG and a capacitor CG in parallel, the load may if desired consist of any form of an electrical impedance.

I claim:

1. A capacitance measurement circuit, in which a principal capacitor and a reference capacitor, each in series with an auxiliary capacitor, are connected between terminals for the supply of an AC voltage, each of said principal and reference capacitors being shunted by two voltage limiting rectifier couplings having opposite directions of conduction, at least one pair of voltage limiting rectifier couplings associated with said principal capacitor and said reference capacitor respectively and having opposite directions of conduction being completed through a common load.

2. A capacitance measurement circuit as in claim 1, in which a pair of voltage limiting rectifier couplings of the principal and reference capacitors, not completed through said common load, each consists of a rectifier diode short circuiting the capacitor in question in its direction of conduction.

3. A capacitance measurement circuit as in claim 1, in which a pair of voltage limiting rectifier couplings of the principal and reference capacitors, completed through said common load, each comprises a Zener diode.

4. A capacitance measurement circuit as in claim 1, in which a pair of voltage limiting rectifier couplings of the principal and reference capacitors completed through said common load comprise a common Zener diode bridged by a series connection of two rectifier diodes having the same direction of conduction and having the common point of said rectifier diodes connected to said common load.

5. A capacitance measurement circuit as in claim 4, comprising two symmetrical pairs of voltage limiting rectifier couplings of the kind set forth in claim 4, each such pair having a common load.

* * * * *